United States Patent
Pinkham

(10) Patent No.: US 10,288,348 B2
(45) Date of Patent: May 14, 2019

(54) METHOD OF DRYING SALT AND SIMILAR MATERIALS THROUGH THE USE OF HEAT ENGINE WASTE HEAT

(71) Applicant: Compass Minerals America Inc., Overland Park, KS (US)

(72) Inventor: Dan Pinkham, Leawood, KS (US)

(73) Assignee: Compass Minerals America Inc., Overland Park, KS (US)

(*) Notice: Subject to any disclaimer, the term of this patent is extended or adjusted under 35 U.S.C. 154(b) by 687 days.

(21) Appl. No.: 14/593,668

(22) Filed: Jan. 9, 2015

(65) Prior Publication Data

US 2015/0198369 A1    Jul. 16, 2015

Related U.S. Application Data

(60) Provisional application No. 61/925,945, filed on Jan. 10, 2014.

(51) Int. Cl.
    *F26B 3/02*    (2006.01)
    *F26B 23/00*   (2006.01)

(52) U.S. Cl.
    CPC .......... *F26B 23/002* (2013.01); *F26B 23/001* (2013.01); *Y02E 20/14* (2013.01); *Y02P 70/405* (2015.11)

(58) Field of Classification Search
    CPC ...... Y02E 20/14; Y02P 70/405; F26B 23/002; F26B 23/001
    See application file for complete search history.

(56) References Cited

U.S. PATENT DOCUMENTS

| | | | |
|---|---|---|---|
| 1,404,742 A | 1/1922 | Condit | |
| 3,605,885 A | 9/1971 | Leeper | |
| 3,742,100 A * | 6/1973 | Boyum | B01J 2/04 264/14 |
| 3,966,853 A * | 6/1976 | Osako | C06B 21/0091 149/46 |
| 4,005,987 A * | 2/1977 | Jury | C01D 5/18 159/4.04 |
| 5,366,514 A | 11/1994 | Becnel, Jr. et al. | |
| 7,607,240 B2 | 10/2009 | Pinkham, Jr. et al. | |

(Continued)

FOREIGN PATENT DOCUMENTS

| | | |
|---|---|---|
| CN | 101319781 | 12/2008 |
| CN | 202417434 | 9/2012 |

(Continued)

OTHER PUBLICATIONS

Machine Translation of CN202769638, 3 pages.

(Continued)

*Primary Examiner* — Jessica Yuen
(74) *Attorney, Agent, or Firm* — Hovey Williams LLP

(57) ABSTRACT

The present invention provides a method and system for generating electricity using a drive for the electrical generator that is powered by an engine (e.g., turbine). The method and system uses high pressure hot gases produced by combustion of a fuel and an oxygen-bearing gas, using at least a portion of the electricity generated to power manufacturing plant equipment. Additionally, hot waste gases from the heat engine are transported to a process dryer (e.g., rotary kiln dryers) to dry minerals, salt, pigments, sands, and clay.

12 Claims, 3 Drawing Sheets

(56) References Cited

U.S. PATENT DOCUMENTS

| | | | |
|---|---|---|---|
| 7,803,248 B2 | 9/2010 | Pinkham, Jr. et al. | |
| 2010/0043445 A1* | 2/2010 | Coronella | F02C 3/28 |
| | | | 60/780 |
| 2010/0115841 A1* | 5/2010 | Cork | C10B 53/02 |
| | | | 48/209 |
| 2012/0264068 A1 | 10/2012 | Hughes et al. | |

FOREIGN PATENT DOCUMENTS

| | | |
|---|---|---|
| CN | 102992427 | 3/2013 |
| CN | 202769638 | 3/2013 |
| CN | 202970754 | 6/2013 |

OTHER PUBLICATIONS

Machine Translation of CN102992427, 5 pages.
Machine Translation of CN202970754, 2 pages.
Machine Translation of CN202417434, 3 pages.
Machine Translation of CN101319781, 5 pages.

* cited by examiner

METHOD OF DRYING SALT AND SIMILAR MATERIALS THROUGH THE USE OF HEAT ENGINE WASTE HEAT

RELATED APPLICATION

This application claims the priority benefit of U.S. Provisional Patent Application No. 61/925,945, entitled METHOD OF DRYING SALT AND SIMILAR MATERIALS THROUGH THE USE OF HEAT ENGINE WASTE HEAT, filed Jan. 10, 2014, which is incorporated by reference herein.

BACKGROUND OF THE INVENTION

Field of the Invention

The present invention is broadly concerned with the use of hot waste gases from a heat engine used in electrical generation, to dry salt, sulfate of potash, or magnesium chloride minerals within process dryers such as rotary kiln dryers, fluidized bed dryers, or dispersion dryers. Even more preferably, at least some portion of the electrical power that is generated is used for running plants and equipment, such as those used for manufacturing those minerals.

Description of the Prior Art

Drying processes for salt (sodium chloride) and similar products, such as sulfate of potash and magnesium chloride, typically utilize either direct fired natural gas heating or indirect heating through heat exchangers, with steam or a hot oil fluid providing the heat. These dryers may be a rotary kiln dryer of either counter-current or co-current design, a fluidized bed dryer, or a dispersion dryer. While effective, direct fired heating is very inefficient (35-40%) and much energy is lost to the environment. Heating with steam or hot oil is also effective, but also has efficiency limits since the heat energy passes through at least two steps to dry the process material. There is need for a drying system for salt and similar products with an improved efficiency from multiple uses of the energy input into the system (above 75%).

SUMMARY OF THE INVENTION

The present invention provides a method of drying a material. The method comprises providing a source of hot waste gas, and introducing that hot waste gas into a dryer. A material to be dried is introduced into the dryer. The material to be dried is selected from the group consisting of minerals, salts, pigments, sands, and clay. The material has an initial moisture content upon being introduced into the dryer, and the hot waste gas causes the material to exit the dryer at a final moisture content that is lower than the initial moisture content (i.e., the hot waste gas dries the material).

In another embodiment, the invention provides a method of drying a material selected from the group consisting of sodium chloride, potassium chloride, magnesium chloride, and potassium sulfate. In this embodiment, the method comprises providing a source of hot waste gas having a temperature of at least about 100° C., and introducing the hot waste gas into a dryer. The material to be dried is introduced into the dryer. That material has an initial moisture content upon being introduced into the dryer, and the hot waste gas causes the material to exit the dryer at a final moisture content that is about 90% or lower than the initial moisture content.

DETAILED DESCRIPTION OF THE PREFERRED EMBODIMENTS

Figure 1:
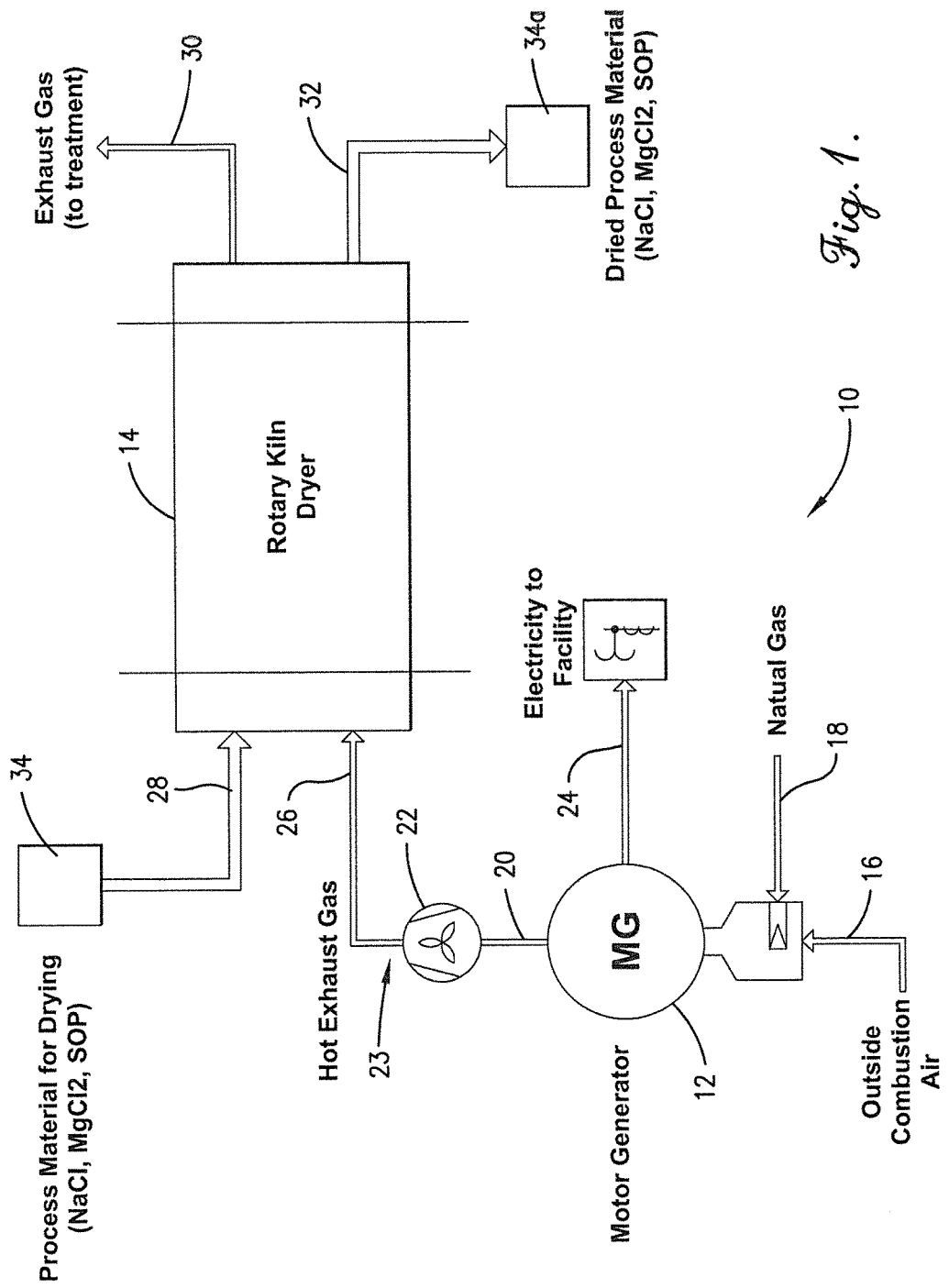
FIG. 1 is a process flow diagram of the inventive combined heat and power gas motor coupled to a rotary kiln dryer.

Referring to FIG. 1, a combined heat and power gas motor system 10 is depicted. The system 10 includes a generator 12 operably connected to a dryer 14. Generator 12 is a motor generator that includes an outside combustion air inlet 16 and a fuel (e.g., natural gas) inlet 18. Generator 12 further includes an exhaust gas outlet 20, coupled with a fan 22, and an electrical transmission line 24.

The generator 12 can be any conventional generator, but is preferably a combustion-type gas turbine. In a typical gas turbine-driven electrical generating system, an oxidizing gas including air, oxygen or an oxygen rich mixture is fed to a compressor, driven by a gas turbine. The oxidizing gas is compressed and as it exits the compressor into a combustion chamber, it is mixed with a fuel and ignited, producing high pressure hot gases that pass through the gas turbine impacting blades in the turbine, causing them to rotate a shaft that drives the compressor and an electrical generator, thus generating electricity. The high pressure hot gases lose pressure as they expend work on the turbine blades and exit the gas turbine as low pressure or atmospheric pressure hot gases, usually at temperatures described below.

The dryer 14 includes an exhaust gas inlet 26, a wet material inlet 28, an exhaust gas outlet 30, and a dried material outlet 32. The dryer 14 can be most any type of dryer, with a preferred type being a rotary kiln dryer. Rotary dryers are slightly inclined cylindrical shells supported by two riding rings running on a set of rollers, and are suitable for drying a wide range of materials because of their ability to process materials having considerable variation in size and composition. A rotary dryer uses lifters mounted in the shell to produce a cascade of particles falling through a hot gas stream. The mechanical lifting of the material allows rotary dryers to be used to dry materials ranging from fine to coarse. It also aids in breaking up lumps, thus promoting a more uniformly dried material. The proper design of a rotary dryer is based upon several factors. The dryer diameter determines the gas velocity. The lifter design determines how the material will fall through the gas stream. The full width of the dryer becomes a shower of material. Chains may also be used when processing very wet material to improve heat transfer. Dryers are also designed for either co-current or counter-current flow, depending on the particular process and application needs. Rotary kiln dryers meeting these requirements are commercially available, such as those sold by Metso Minerals Industries Inc. (Danville, Pa.).

In use, generator 12 would be operated following "normal" procedures, using the desired fuel coming into fuel inlet 18, etc. That is, generator 12 would be run just as it would if it were not operably connected to dryer 14, as part of the heat and power gas motor system 10. Additionally, the generator 12 will generate electricity can be used for local electrical demand requirements (e.g., to power the facility and/or equipment present or near the facility of the system 10), or sold back to a utility. The difference in the inventive system 10 is that exhaust gas outlet 20 of generator 12 is connected to a fan 22, so that it can be metered to exhaust gas inlet 26 of dryer 14. It will be appreciated that fan 22 will also preferably include an outlet line or vent (not shown) that allows it to vent the exhaust to the outside (similar to the venting that would occur if the generator 12 were not a part of the system 10), for situations where it is not desired to transport any or all of the exhaust gas to the dryer 14.

Typical gases that will be found in the waste gas emitted from generated 12 include those selected from the group consisting of carbon monoxide, carbon dioxide, oxygen, nitrogen, argon, and mixtures thereof. The gas transported out of exhaust gas outlet 20, and into exhaust gas inlet 26 should have a temperature of at least about 100° C., preferably from about 200° C. to about 600° C., and more preferably from about 250° C. to about 540° C. Additionally, the gases should be less than saturated with water. More particularly, the gases should have less than about 6% by mass water per cubic meter of gas, preferably less than about 4% by mass water per cubic meter of gas, and more preferably from about 2% by mass water per cubic meter of gas to about 4% by mass water per cubic meter of gas, as measured following a standard Fischer titration.

The gases will typically have a pressure of less than about 1 psig (and preferably from about 0.1 psig to about 0.3 psig), but that pressure can be boosted with the fan 22, as shown. The flow rate of the gas into the inlet 26 will be dependent on the flow rate of the material to be dried, but typical flow rates will fall in the range of from about 130,000 lbs/hour to about 400,000 lbs/hour.

While hot exhaust gas is being directed into dryer 14 (in this case a kiln dryer), the material 34 to be dried is also metered into the dryer. Examples of material 34 that can be dried with the present inventive method include minerals, salts, salts, pigments, sands, and clay. Ideal salts for use in this method include those selected from the group consisting of sodium chloride, potassium sulfate (sulfate of potash), magnesium chloride, potassium chloride, sodium sulfate, ammonium sulfate, ammonium nitrate, and urea.

In the system 10 of FIG. 1, the exhaust gases are fed co-currently to the material 34, but it will be appreciated that those gases could be fed counter-currently to the material 34, depending upon the specific dryer design. The material 34 being introduced into inlet 28 of dryer 14 will have a typical moisture content of from about 5% by weight to about 50% by weight water, preferably from about 5% by weight to about 40% by weight, and more preferably from about 3% by weight to about 30% by weight water, based upon the total weight of the wet material 34 taken as 100% by weight. The flow rate of the material 34 into the inlet 28 is material- and process-dependent, but typical flow rates are from about 0.4 tons/min to about 1.2 tons/min.

The exhaust gas preferably retains essentially the same temperatures described above as it enters the dryer 14. As the material 34 passes through dryer 14, the heat from the exhaust gas evaporates the moisture from material 34, thus drying it. The water vapor and other gases exit the dryer 14 from exhaust gas outlet 30, where they can be treated, as necessary, using conventional treatment methods. The dried material 34a exits the dryer 14 through dried material outlet 32, where it is ready to be packaged, further processed, transported, etc., depending upon the particular material and its desired final use. Advantageously, the dried material 34a exits outlet 32 with a reduction in moisture content from the initial moisture content of material 34 upon entering inlet 28. That is, the final moisture content of dried material 34a is less than about 50% of the initial moisture content of material 34, preferably less than about 40%, more preferably less than about 30%, and even more preferably from about 10% to about 20% of the initial moisture content of material 34. For example, if material 34 entered the dryer 14 with a moisture content of 50%, dried material 34a would exit with a moisture content of about 25% or less, preferably about 20% or less, more preferably about 15% or less, and even more preferably from about 5% to about 10%. Thus, the dried material 34a will have a typical moisture content of from about 1% by weight to about 15% by weight, preferably from about 1% by weight to about 10% by weight, and more preferably from about 1% by weight to about 5% by weight, based upon the total weight of the dried material 34a taken as 100% by weight.

Figure 2:
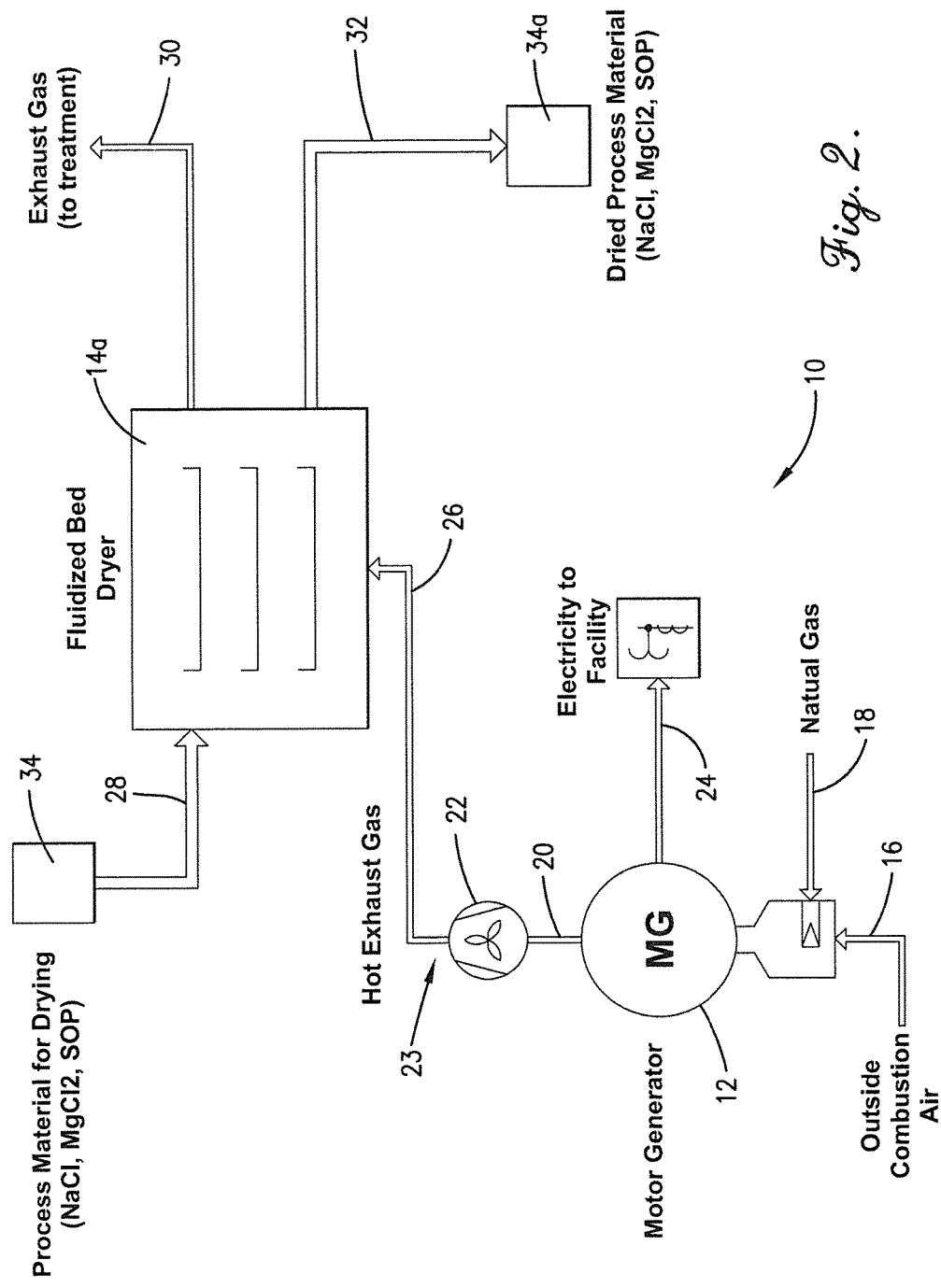
FIG. 2 is a process flow diagram of the inventive combined heat and power gas motor coupled to a fluidized bed dryer.

FIG. 2 depicts an alternative embodiment to that shown in FIG. 1, with like numbering representing similar parts. The sole difference between the embodiments is that dryer 14, which was previously a rotary kiln dryer, has been replaced with a fluidized bed dryer 14a. A "fluidized bed" refers to a bed of finely divided solids through which a gas is passed, and which is in a state between that of a static bed and one where all the solids are suspended in the gas stream, as in pneumatic conveying. The introduction of an appropriate gas flow into the material bed brings about the onset of fluidization. Bubbles of gas pass through the bed of material, creating a condition of rapid mixing. The bed has the appearance of a vigorously boiling liquid, and the bed of material takes on many of the properties of a fluid. It exerts a hydrostatic head, and the material will flow through a hole in the vessel, or over and under a weir within the bed. The boiling action in a fluidized bed brings particles into contact with each other, removing dust that is carried off in the gas stream. The same boiling action ensures very thorough mixing, giving uniform temperature conditions and enabling complete drying to take place without overheating the material. Suitable fluidized bed dryers 14a can be obtained from Ventilex USA, Inc. (Middletown, Ohio).

Figure 3:
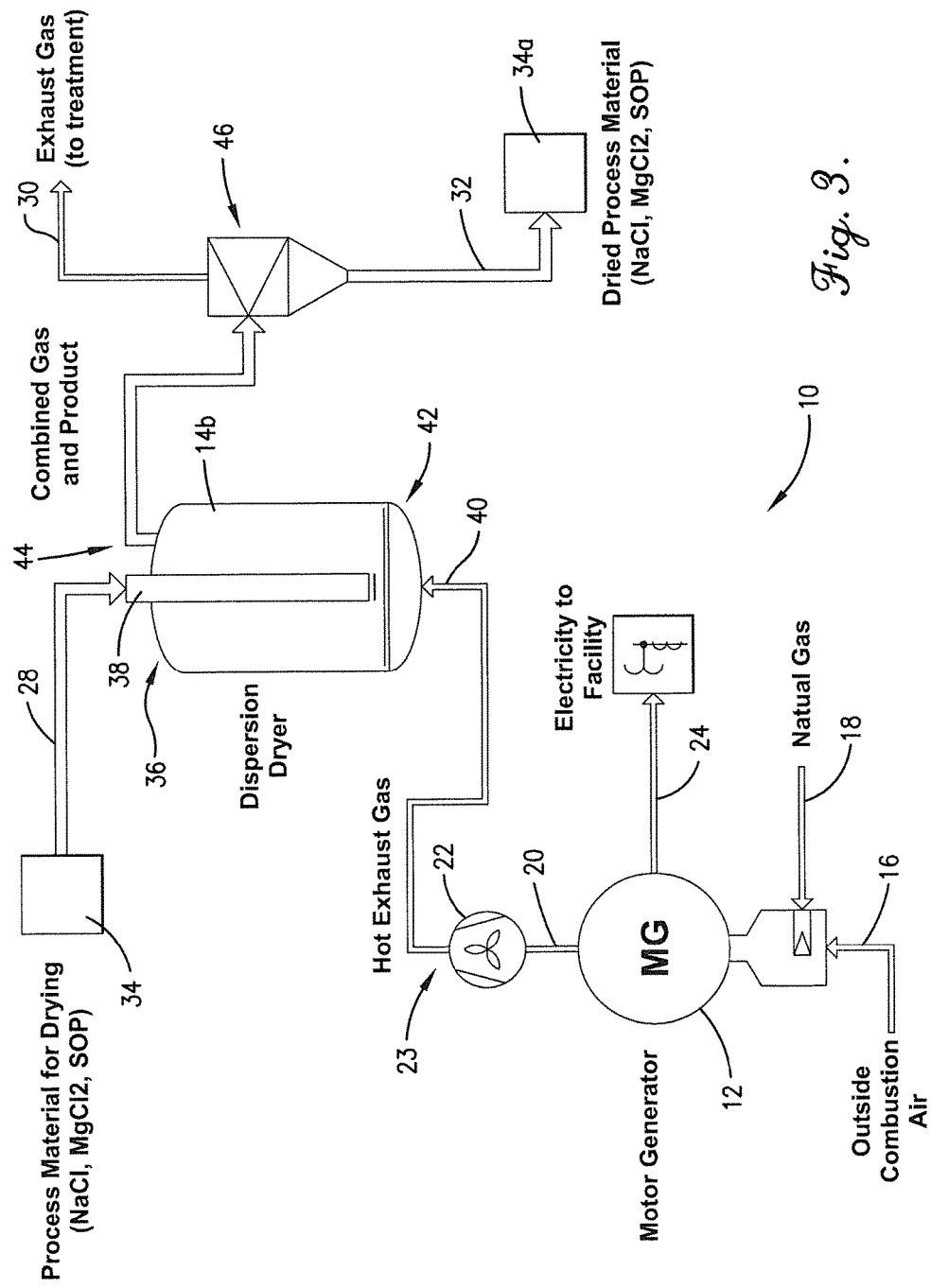
FIG. 3 is a process flow diagram of the inventive combined heat and power gas motor coupled to a dispersion dryer.

A further embodiment is depicted in FIG. 3, where a dispersion dryer 14b now replaces dryer 14/14a. This dryer 14b differs the previous embodiments in that wet material 34 enters dryer 14b at the top 36 via a mechanical feeder 38, such as a belt conveyor or screw conveyor. The hot exhaust gas enters the dryer 14b via a tangential inlet 40 at the bottom 42 of the dryer 14b, creating a circular flow of gas with the dryer 14b. This flow, coupled with a specially designed perforated plate (not shown) to address specific wet process material characteristics, picks up the moist process particles, conveys them up through the dryer 14b, dries them, and carries them through a combined gas and exhaust outlet 44 on the top 36 of dryer 14b. The gas and dried process material are separated downstream, typically via a device such as a cyclone separator 46. Suitable dispersion dryers 14b can be obtained from Allgaier Process Technology (Uhingen, Germany).

It will be appreciated that modifications can be made to the above to accommodate certain situations. For example, should that temperature be too high for the material to be dried, or for the dryer being utilized, heat exchanger cooling loops could be included on the gas motor to provide heat to a heat transfer fluid (e.g., Therminol manufactured by Eastman, Kingsport Tenn.), which in turn can heat an air stream feeding the dryer. A third option would be to dilute the hot exhaust gases from the gas motor with ambient air to the point that temperature is not an issue for either process material or equipment. This option requires additional auxiliary equipment for air movement and balancing.

Finally, one of ordinary skill in the art would understand that the gas motor is sized based on the amount of heat needed to dry the wet process material completely, with the amount of electricity generated being dependent on the equipment sizing.

I claim:

1. A method of drying a material in a manufacturing plant, said method comprising:
   generating electricity with an electrical generator;
   providing a hot waste gas stream having a temperature of about 100° C. to about 600° C., wherein said hot waste gas stream is withdrawn from an exhaust gas outlet of a gas turbine coupled to said electrical generator;
   introducing said hot waste gas stream into a dryer;
   while said hot waste gas is being introduced into said dryer, introducing the material to be dried into said dryer, said material to be dried:
      having an initial moisture content upon being introduced into said dryer; and
      being selected from the group consisting of sodium chloride, potassium chloride, magnesium chloride, and potassium sulfate, said hot waste gas causing dried material to exit said dryer at a final moisture content that is lower than said initial moisture content; and
   transmitting at least a portion of said electricity generated by said electrical generator to at least one piece of equipment in said manufacturing plant to provide electrical power to said piece of equipment, said piece of equipment being used in manufacturing said material to be dried.

2. The method of claim 1, wherein said dryer is selected from the group consisting of rotary kiln dryers, fluidized bed dryers, and dispersion dryers.

3. The method of claim 1, wherein said material to be dried has an initial moisture content of from about 5% to about 50% by weight, based upon the total weight of the material to be dried as it is introduced into the dryer taken as 100% by weight.

4. The method of claim 1, wherein said dried material has a final moisture content of from about 1% to about 15% by weight, based upon the total weight of the material as it exits the dryer taken as 100% by weight.

5. The method of claim 1, wherein said final moisture content is less than about 40% of said initial moisture content.

6. The method of claim 1, wherein said hot waste gas has a temperature of about 200° C. to about 600° C. as it is being introduced into the dryer.

7. The method of claim 1, further comprising contacting said material to be dried with said hot waste gas in said dryer, wherein at least a portion of the heat from said hot waste gas evaporates at least a portion of the moisture on said material to be dried to provide the dried material.

8. A method of drying a material in a manufacturing plant, said method comprising:
   generating electricity with an electrical generator;
   providing a hot waste gas stream having a temperature of about-100° C. to about 600° C. wherein said hot waste gas stream is withdrawn from an exhaust gas outlet of a gas turbine coupled to said electrical generator;
   introducing said hot waste gas stream into a dryer;
   while said hot waste gas is being introduced into said dryer, introducing the material to be dried into said dryer, said material to be dried:
      having an initial moisture content upon being introduced into said dryer, and
      being selected from the group consisting of sodium chloride, potassium sulfate, magnesium chloride, and potassium chloride, said hot waste gas causing dried material to exit said dryer at a final moisture content that is less than about 50% of said initial moisture content; and
   transmitting at least a portion of said electricity generated by said electrical generator to at least one piece of equipment in said manufacturing plant to provide electrical power to said piece of equipment, said piece of equipment being used in manufacturing said material to be dried.

9. The method of claim 8, wherein said dryer is selected from the group consisting of rotary kiln dryers, fluidized bed dryers, and dispersion dryers.

10. The method of claim 9, wherein said dryer is a rotary kiln dryer.

11. The method of claim 8, wherein said hot waste gas has a temperature of about 200° C. to about 600° C.

12. The method of claim 8, further comprising contacting said material to be dried with said hot waste gas in said dryer, wherein at least a portion of the heat from said hot waste gas evaporates at least a portion of the moisture on said material to be dried to provide the dried material.

* * * * *